Figure 1:
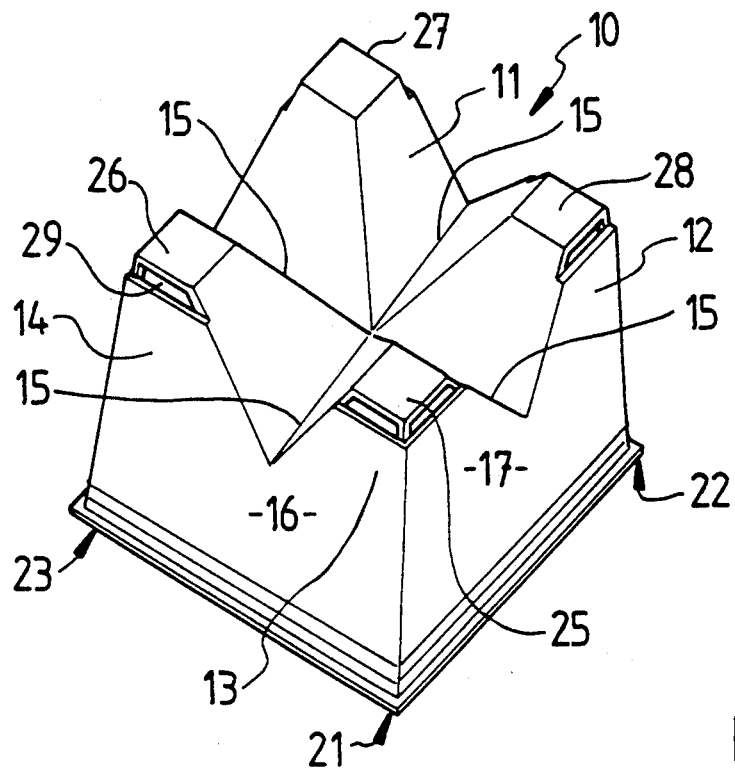

United States Patent [19]
Hawthorne

[11] Patent Number: 5,327,679
[45] Date of Patent: Jul. 12, 1994

[54] PLANT ROOT GROWTH TRAINING DEVICE

[76] Inventor: David V. Hawthorne, Winston Road, Palmwoods, Queensland, 4555, Australia

[21] Appl. No.: 953,116

[22] Filed: Sep. 29, 1992

[30] Foreign Application Priority Data

Sep. 30, 1991 [AU] Australia .............................. PK8628

[51] Int. Cl.⁵ .............................................. A01G 23/02
[52] U.S. Cl. .............................................. 47/73; 47/66
[58] Field of Search ...................................... 47/73, 66

[56] References Cited

U.S. PATENT DOCUMENTS

| D. 248,022 | 5/1978 | Makilaakso | 47/73 |
| 3,830,015 | 8/1974 | Belgiorno | 47/73 |

FOREIGN PATENT DOCUMENTS

| 0274769 | 7/1988 | European Pat. Off. | 47/73 |
| 547677 | 4/1932 | Fed. Rep. of Germany | 47/73 |
| 3531268 | 3/1987 | Fed. Rep. of Germany | 47/66 |
| 2412253 | 8/1979 | France | 47/66 |
| 0646951 | 2/1979 | U.S.S.R. | 47/73 |
| 10621 | of 1894 | United Kingdom | 47/66 |

Primary Examiner—Thuy M. Bui
Assistant Examiner—Joanne C. Downs
Attorney, Agent, or Firm—Fitzpatrick, Cella, Harper & Scinto

[57] ABSTRACT

A plant root growth training device in the form of a plant pot, particularly suited to the early development of juvenile trees or shrubs. The pot is designed so as to have four hollow legs 11, 12, 13 and 14 which define generally pyramid shaped root growth passages to confine lower root growth to four separate regions of the pot. The pot includes upstanding root growth training means in the form of ridges 15 disposed inside the pot about midposition so that a plant planted generally centrally within the pot will have its root growth influenced to form a root structure having clumps of roots. These clumps are confined to the legs 11, 12, 13 and 14 so that on removal of the juvenile plant from the pot 10, the root structure of the plant will have a divergent root pattern.

4 Claims, 2 Drawing Sheets

PLANT ROOT GROWTH TRAINING DEVICE

This invention relates to a plant root growth training device and in particular but not limited to a plant pot for producing structurally sound root systems in juvenile plants.

Orchard or plantation trees or shrubs typically commence life as Juveniles confined to a pot or the like. Confinement to a pot can result in defective root development. Defects occurring in a Juvenile are carried through to maturity and these defects can adversely inhibit plant growth, fruit yield and also reduce longevity.

It is an object of the present invention to alleviate at least to some degree the aforementioned problems associated with the prior art.

In one aspect therefore, the present invention resides in a plant root growth training device having upstanding root growth training means adapted to influence a plants root development to form a root structure having a generally divergent root pattern.

The upstanding root growth training means can be any means for directing root growth including means for simply redirecting roots growing in an undesirable way to means confining groups of root to specific regions within say, a plant pot. In other words, the means promotes development of diverging root groups or clumps so as to reduce the tendency of a confined root structure in say a pot or the like to ball or circle or otherwise become entangled. Typically, the root growth training means comprises a plurality of upstanding walls or other means above which a juvenile plant is initially planted, the walls or other means defining a plurality of circumferentially spaced and downwardly directed root growth passage means which influence root development to form a divergent root pattern in the form of a plurality of spaced clumps of roots, the clumps corresponding to root growth confined to the respective passage means.

The passage means can be a plurality of blind passages or the passage means can be open at opposite ends thereof. In one preferred form, the device comprises a hollow body for holding potting media and the plurality of passage means comprises a plurality of circumferentially spaced hollow legs forming a lower portion of the hollow body. The hollow body is typically polygonal in transverse cross-section.

In another form which is preferably utilised in combination with the passage means, there is provided a root growth deflecting means which, while not confining root growth serves to redirect root growth in a desirable manner. In a suitable potting media, roots have a natural tendency to propagate downwardly and outwardly until the roots strike a pot wall or other obstacle. Typical deflecting means therefore can include surfaces which interrupt undesirable root growth such as circular root growth and deflect root growth downwardly. Typically, a device according to a preferred form of the invention includes an inner upright wall where the deflector means comprise upwardly and downwardly extending internal corners or bends in said wall or an upwardly and downwardly extending projection protruding from the wall or a similarly extending recess in the wall. Where the deflecting means is used in combination with the passage means, a plurality of deflecting means is typically employed, each deflecting means focusing root growth toward an adjacent one of the plurality of passage means.

The device typically includes other useful features which can be formed as a consequence of the existence of the abovementioned features or can be created independently and in addition to same. For example, where the invention is applied to a pot, the root growth training means can be formed so as to have a secondary function where the training means is so made and arranged as to displace potting media thereby functioning as a potting media displacement means to reduce the volume of potting media required to fill a pot when compared to prior art pots. Likewise, a preferred device is equipped with water drainage openings in a lower extremity of the device, the device having a plurality of potting media pockets, the pockets having internal surfaces defining a plurality of drainage surfaces communicating with said drainage openings in order to enhance drainage.

Figure 2:
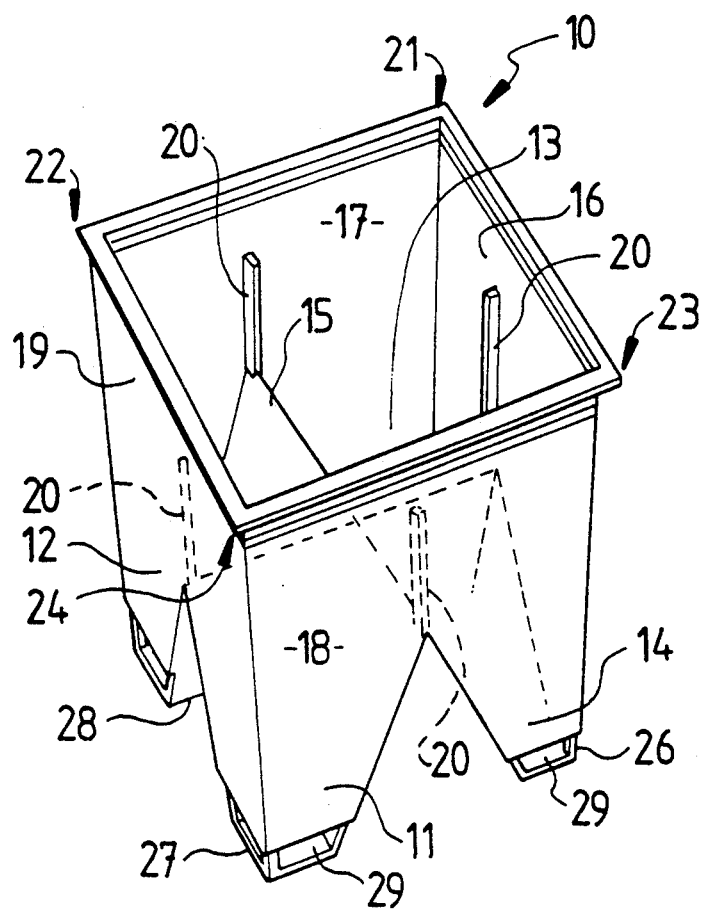
Figure 3:
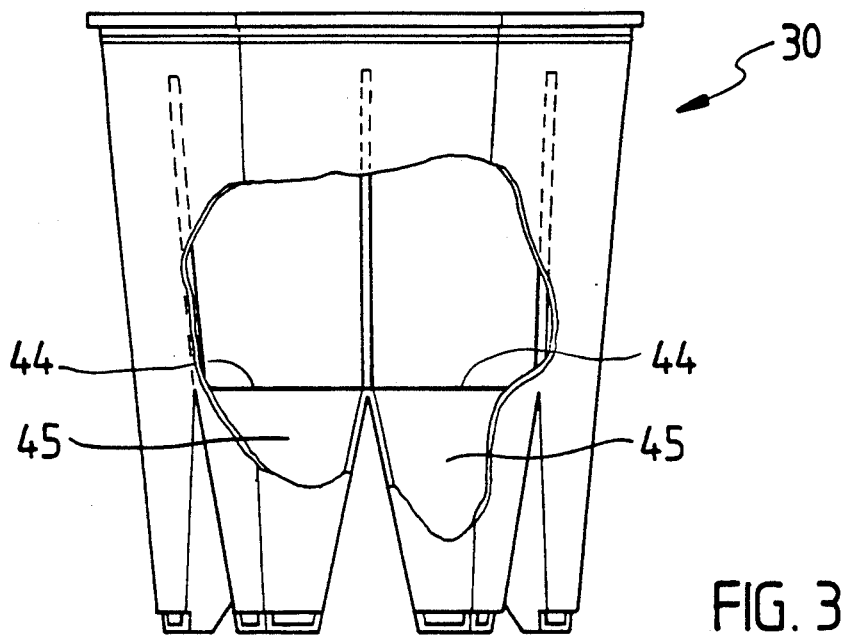
Figure 4:
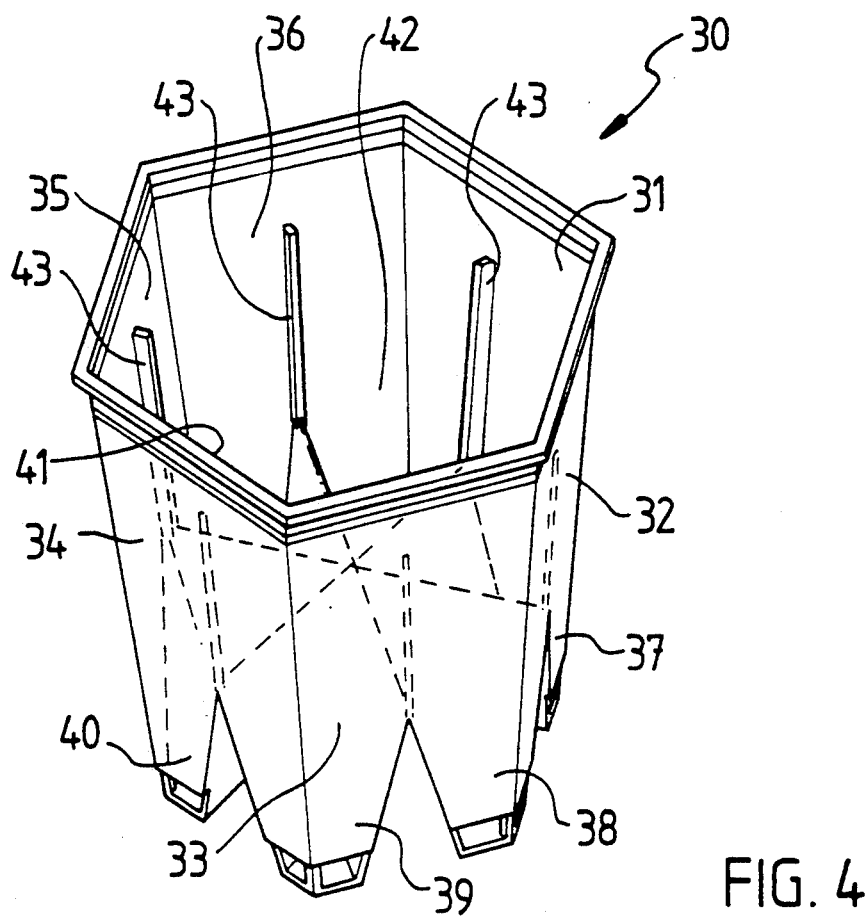

In order that the invention can be more readily understood and be put into practical effect, reference will now be made to the accompanying drawings and wherein:

FIGS. 1 and 2 are pictorial views from below and above of one embodiment of a plant root growth training device according to the invention; and FIGS. 3 and 4 are respective cut-away side and pictorial views of a second embodiment of a plant root growth training device according to the invention.

Referring to the drawings and initially to FIGS. 1 and 2, there is illustrated a plant root growth training device in the form of a plant pot, particularly suited to the early development of juvenile trees or shrubs. The pot is designed so as to have four hollow legs 11, 12, 13 and 14 which as can be seen, define generally pyramid shaped root growth passages to confine lower root growth to four separate regions of the pot. The pot therefore includes upstanding root growth training means in the form of ridges 15 disposed inside the pot about midposition so that a plant planted generally centrally within the pot will have its root growth influenced to form a root structure having clumps of roots. These clumps are confined to the legs 11, 12, 13 and 14 so that on removal of the juvenile plant from the pot 10, the root structure of the plant will have a divergent root pattern.

In the illustrated embodiment, the pot 10 is square in section including walls 16, 17, 18 and 19, each of which are generally centrally divided by the ridges 15 which extend generally horizontally across the pot forming cross shaped ridging within the pot. Each wall 16, 17, 18 and 19 includes a centrally disposed rib 20 which extend generally vertically from the ridges 15 in order to deflect root growth growing along the walls 16, 17, 18 and 19 in a downward direction focusing root growth in the regions of the corners 21, 22, 23 and 24 and into their respective legs 13, 12, 14 and 11.

The pot includes feet 25, 26, 27 and 28, each of which have drainage holes 29. The pot is tapered so that pots are stackable.

FIGS. 3 and 4 illustrate a second embodiment which in this case is another pot 30, the only difference between the pot 30 and the pot 10 being that the pot 30 is of hexagonal section. Each of the walls 31, 32, 33, 34, 35 and 36 is configured generally in the same way as the previous embodiment so that in this case, six hollow legs 37, 38, 39, 40, 41 and 42 are provided. Each wall includes a root deflecting rib 43 and root growth is trained either side of the horizontally disposed star shaped ridging 44 so as to confine root growth to form six independent clumps of roots in the legs of the pot. As in the previous embodiment, the pot includes feet and drainage openings.

In each of the embodiments, the polygonal section provides corners having internal angles which promote desirable root growth inasfar as the corners assist in deflecting root growth into the legs. The embodiment of FIGS. 1 and 2 is typically used for smaller pots whereas larger pots above, say 250 mm across the top can have the hexagonal form or even more faces can be employed. Typically, pots preferably approximate a round pot, say having eight faces so that the pots approximate a round shape in order for the pots to be used with existing automated potting machinery.

It will be appreciated from the foregoing that the use of upstanding root growth training means in this case in the form of horizontally disposed ridges 15 in the embodiments of FIGS. 1 and 2 and 44 in the embodiments of FIGS. 3 and 4 is the mechanism which promotes the divergent root growth pattern. It will also be appreciated that the use of these upstanding root growth training means need not be in association with the walls of a pot but can be utilised in a more open environment. In the illustrated embodiment, the ridges 15 and 44 are formed integral with the other parts of the pot but it will be appreciated that these can be formed as removable dividers which can be configured for use in a pot of any shape.

In the illustrated embodiments, the legs are spaced and it will be appreciated that the V-shaped formations between the legs displace potting media, thereby reducing the amount of potting media that would otherwise be used in a standard pot of similar size. Likewise, as can be seen in FIG. 3, each of the legs includes internal walls 45 due also to the V-shaped formations forming the legs and this construction increases the wall surface area to potting media contact area and this has the overall effect of improving drainage from the pot.

Whilst the above has been given by way of illustrative example of the present invention, many variations and modifications thereto will be apparent to those skilled in the art without departing from the broad ambit and scope of the invention as set forth in the appended claims.

I claim:

1. A plant root growth training device comprising an open topped container having a bottom wall including water drainage openings and a peripheral wall having an upper peripheral edge, said peripheral wall extending from the bottom wall of the container to the upper peripheral edge and defining a longitudinal passageway extending from the upper peripheral edge and terminating at said water drainage openings in said bottom wall, said passageway including an upper main passageway and a plurality of lower branches, said main passageway having a lower end located in said container between said upper peripheral edge and said bottom wall and said branches extending from the lower end of the main passageway to adjacent the bottom wall of the container, said branches defining a plurality of separate angularly spaced longitudinally extending outwardly tapering passageways, each tapering passageway being defined by the peripheral wall of the container and a pair of v-shaped outwardly diverging walls, with the walls of adjacent tapering passageways intersecting and terminating in angularly spaced radially extending ridges located adjacent the lower end of the main passageway, the ridges and said v-shaped outwardly diverging walls of the tapering passageways providing a plurality of radially extending ridges adjacent the lower end of the main passageway alternating with longitudinally and radially extending valleys terminating adjacent the bottom of the container.

2. A plant root growth training device according to claim 1 wherein the peripheral wall includes a plurality of spaced apart longitudinal ribs protruding into the main passageway, each rib commencing adjacent a respective ridge and extending upwardly toward the upper peripheral edge of the peripheral wall of the container.

3. A plant root growth training device according to claim 1 wherein the peripheral wall is polygonal in plan having a plurality of corners extending longitudinally from the upper peripheral edge of the container to the bottom of the container and wall sections bridging between the corners, each of said corners and said wall sections adjacent thereto providing an outer v-shaped wall for a respective one of said tapering passageways, the number of corners being the same as the number of tapering passageways.

4. A plant root growth training device according to claim 2 wherein the peripheral wall is polygonal in plan having a plurality of corners extending longitudinally from the upper peripheral edge of the container to the bottom of the container and wall sections bridging between the corners, each of said corners and said wall sections adjacent thereto providing an outer v-shaped wall for a respective one of said tapering passageways, the number of corners being the same as the number of tapering passageways.

* * * * *